US008118462B2

(12) United States Patent
Inoue et al.

(10) Patent No.: US 8,118,462 B2
(45) Date of Patent: Feb. 21, 2012

(54) AUTOMOTIVE LAMP

(75) Inventors: Takashi Inoue, Shizuoka (JP); Yuji Yasuda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 310 days.

(21) Appl. No.: 12/490,058

(22) Filed: Jun. 23, 2009

(65) Prior Publication Data

US 2009/0316425 A1 Dec. 24, 2009

(30) Foreign Application Priority Data

Jun. 23, 2008 (JP) ................................. 2008-163220

(51) Int. Cl.
*B60Q 1/00* (2006.01)

(52) U.S. Cl. ......................... 362/547; 362/297; 362/373

(58) Field of Classification Search ............. 362/249.02, 362/294, 373, 546, 547
See application file for complete search history.

(56) References Cited

U.S. PATENT DOCUMENTS

| | | | | |
|---|---|---|---|---|
| 7,866,852 | B2 * | 1/2011 | Kulkarni | 362/294 |
| 2006/0076572 | A1 | 4/2006 | Huber et al. | |
| 2009/0303742 | A1 * | 12/2009 | Yasuda | 362/547 |
| 2009/0310372 | A1 * | 12/2009 | Zhou et al. | 362/373 |

FOREIGN PATENT DOCUMENTS

| | | |
|---|---|---|
| CN | 2479645 | 2/2002 |
| DE | 102005060736 | 7/2007 |
| DE | 102006037481 | 2/2008 |
| EP | 1643188 | 4/2006 |
| JP | 2006-286395 | 10/2006 |
| JP | 2007-128728 | 5/2007 |
| JP | 2009-266436 | 11/2009 |

OTHER PUBLICATIONS

Text of the First Office Action, Chinese Patent Application No. 200910150314.9, document dated Jul. 7, 2010 with English translation, 7 pages total.

EP 09163408.9 Search Report dated Aug. 24, 2009.

Notice Requesting Submission of Opinion, Dispatch No. 9-5-2001-021478684, Dispatch Date Apr. 21, 2011.

Translation for Notice Requesting Submission of Opinion (Notification of Reason(S) for Refusal), Patent Application No. 10-2009-0054876, Dispatch No. 9-5-2001-021478684, Dispatch Date Apr. 21, 2011.

* cited by examiner

*Primary Examiner* — John A Ward
(74) *Attorney, Agent, or Firm* — Fulwider Patton LLP

(57) ABSTRACT

An automotive lamp includes an LED as a light source, a heatsink for radiating heat produced by the LED, the heatsink including a plurality of plate fins installed upright on base parts and a plurality of ventilation passages formed between the plate fins, a centrifugal fan for performing the forced air cooling of the plate fins by sending air through the ventilation passages of the heatsink, the centrifugal fan having air inlets in an axial direction for drawing air in, a left-side air outlet and a right-side air outlet for discharging air in left-right directions perpendicular to the axial direction, and a lamp housing for housing the LED, heatsink and centrifugal fan. The plate fins of the heatsink are formed such that the entrance of at least one of a plurality of ventilation passages faces the left-side air outlet and the right-side outlet of the centrifugal fan.

10 Claims, 3 Drawing Sheets

AUTOMOTIVE LAMP

CROSS-REFERENCES TO RELATED APPLICATIONS

This application claims priority from Japanese Application No. 2008-163220, filed Jun. 23, 2008 incorporated by reference in its entirety.

BACKGROUND

The present invention relates to an automotive lamp and, in particular, to an automotive lamp whose light source is a semiconductor light emitting device.

DESCRIPTION OF THE RELATED ART

There are automotive lamps that use a semiconductor light emitting device, such as an LED (light emitting diode) or the like, as the light source. When a semiconductor light emitting device is used as the light source for an automotive lamp, the level of light intensity required of the automotive lamp must be satisfied by a maximum use of the light emission from the semiconductor light emitting device.

Generally, a semiconductor light emitting device produces more heat for larger current which is supplied to obtain a greater output. And this correspondingly lowers the luminance efficiency of the semiconductor light emitting device as it gets hotter due to the heating. Thus, there have been various heat radiation structures proposed for automotive lamps in order to radiate heat from the semiconductor light emitting device efficiently. An example can be found in Japanese Patent Application Publication No. 2006-286395.

With the automotive lamp as disclosed in Japanese Patent Application Publication No. 2006-286395, however, the air inside a lamp chamber with the LED installed therein is circulated by natural convection. Accordingly, the air circulation inside the lamp chamber is not much promoted, and therefore there is room for improvement regarding the heat radiation efficiency.

SUMMARY OF THE INVENTION

The present invention has been made in view of the foregoing circumstances, and one of the purposes thereof is to provide an automotive lamp capable of efficiently radiating heat that is produced by the semiconductor light emitting device.

To resolve the foregoing problems, an automotive lamp according to one embodiment of the present invention comprises: a semiconductor light emitting device as a light source; a heatsink which radiates heat produced by the semiconductor light emitting device, the heatsink including a plurality of plate fins installed upright on a base part and a plurality of ventilation passages formed between the plate fins; a centrifugal fan which performs a forced air cooling of the plate fins by sending air through the ventilation passages of the heatsink, the centrifugal fan having air inlets open in an axial direction thereof for drawing air in and a plurality of air outlets for discharging air in a plurality of directions perpendicular to the axial direction thereof; and a lamp housing which houses the semiconductor light emitting device, heatsink, and centrifugal fan, wherein the plate fins of the heatsink are formed such that an entrance of at least one of the plurality of ventilation passages faces each of the air outlets of the centrifugal fan.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENTS

The invention will now be described by reference to the preferred embodiments. This does not intend to limit the scope of the present invention, but to exemplify the invention.

A detailed description is given hereinbelow of an automotive lamp according to the embodiments with reference to the accompanying drawings.

Figure 1:
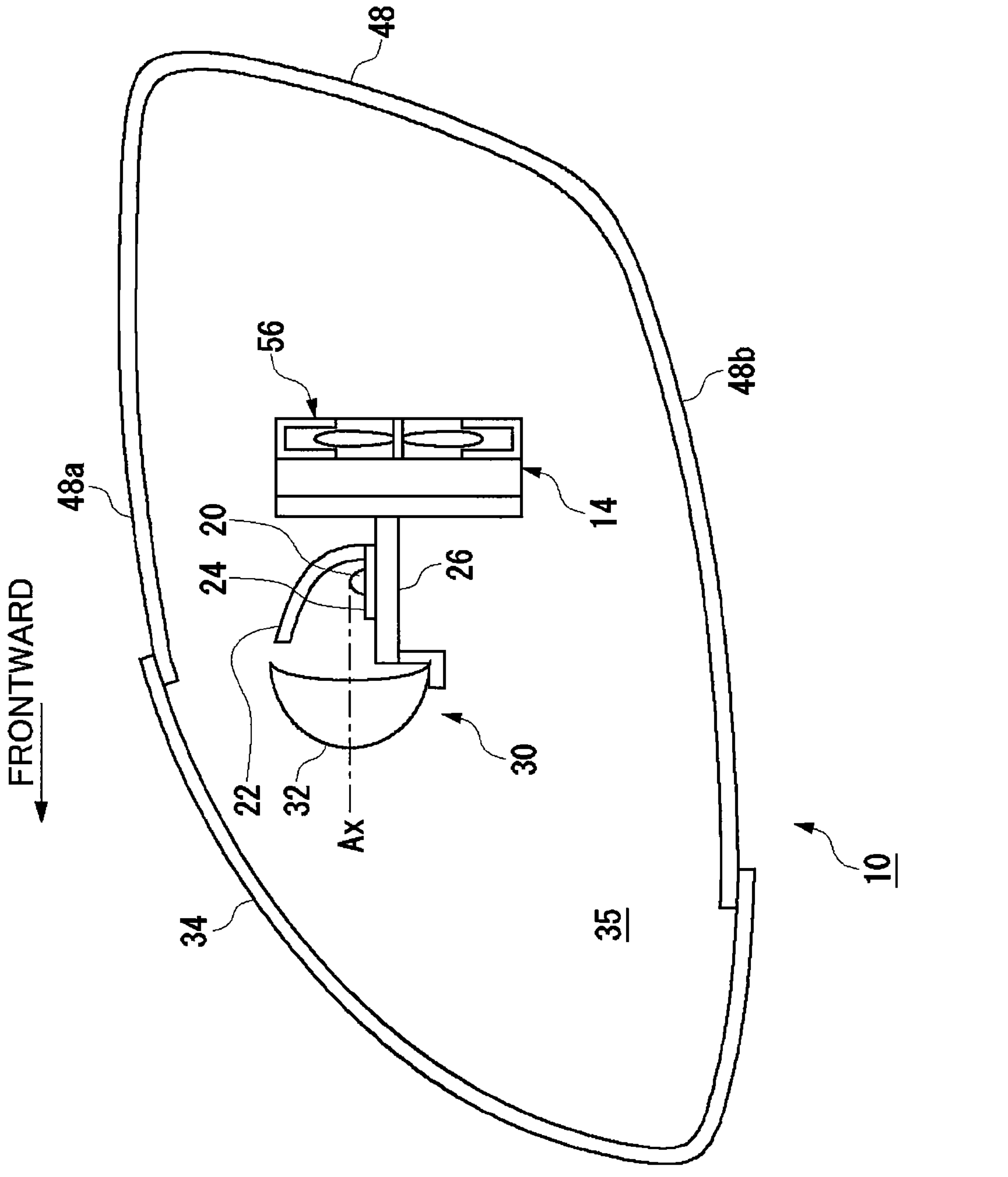
FIG. 1 is a schematic cross-sectional view of an automotive lamp according to a first embodiment of the present invention.

FIG. 1 is a schematic cross-sectional view of an automotive lamp 10 according to a first embodiment of the present invention. As illustrated in FIG. 1, the automotive lamp 10 is of a structure such that a lamp unit 30 is housed in a lamp housing which includes a lamp body 48 formed of a resin, which is open in the front, and an outer cover 34 formed of a translucent material, which covers the front of the lamp body 48 in an airtight manner.

It is to be noted that although only a single lamp unit 30 is shown in FIG. 1, the automotive lamp 10 houses three lamp units, namely, a first lamp unit, a second lamp unit, and a third lamp unit, within the lamp housing thereof. The first to third lamp units are of an identical structure. The first to third lamp units are installed adjacent to each other left to right in a row. That is, facing the front of the automotive lamp 10, the first lamp unit is located on the left, the second lamp unit in the middle, and the third lamp unit on the right. The lamp unit 30 shown in FIG. 1 is the second lamp unit located in the middle. Hereinbelow, the first to third lamp units, when they are named generically, will simply be referred to as "lamp unit 30".

The lamp unit 30, which is a so-called projector-type lamp unit, uses an LED as the light source. Each lamp unit 30 includes an LED 20, a thermally conductive insulating substrate 24, a reflector 22, a mounting member 26, and a projection lens 32. The LED 20 is a white-color LED comprising a not-shown LED chip and an approximately hemispherical cap covering the LED chip. The LED 20 is disposed on the thermally conductive insulating substrate 24 which is formed of a ceramic or the like. The LED 20 is installed in a position on a light axis Ax of the lamp unit 30 such that the light emission direction thereof faces a direction perpendicular to the light axis Ax. Power is supplied to the LED 20 through a wiring pattern formed on the thermally conductive insulating substrate 24.

The reflector 22, which is shaped as a half dome made of, for instance, a polycarbonate, is disposed over the LED 20. The reflector 22 has a reflecting surface on the inside thereof which reflects light from the LED 20 in the front direction in such a manner as to concentrate it toward the light axis Ax.

The projection lens 32, which is a planoconvex aspheric lens having a convex front surface and a plane rear surface, irradiates the image of the light source formed on the rear focal plane as a reverted image. The mounting member 26 is substantially a flat plate formed of a metal having aluminum as the main component by die casting. And anchored to the upper surface thereof are the substrate 24 mounted with the LED 20 and the reflector 22. Also, attached to the front end of the mounting member 26 is the projection lens 32.

The rear end of the mounting member 26 of each lamp unit 30 is attached to a heatsink 14 which is provided in a lamp chamber 35. The heatsink 14, which is formed of aluminum or other metal having a high thermal conductivity, radiates heat produced by the LED 20 of each lamp unit 30 into the air inside the lamp chamber 35. Attached to the heatsink 14 is a centrifugal fan 56. The centrifugal fan 56 draws air in from an axial direction and sends air out in centrifugal directions. A detailed description of the structures of the heatsink 14 and the centrifugal fan 56 will be given with reference to FIG. 2.

The lamp unit 30, the heatsink 14 and the centrifugal fan 56 are installed within the lamp chamber 35 by means of a not-shown support member in such a manner that the light emitted by each lamp unit 30 can be irradiated frontward from the automotive lamp 10. In the first embodiment, the lamp unit 30, the heatsink 14 and the centrifugal fan 56 are installed near the center of the lamp chamber 35.

Figure 2:
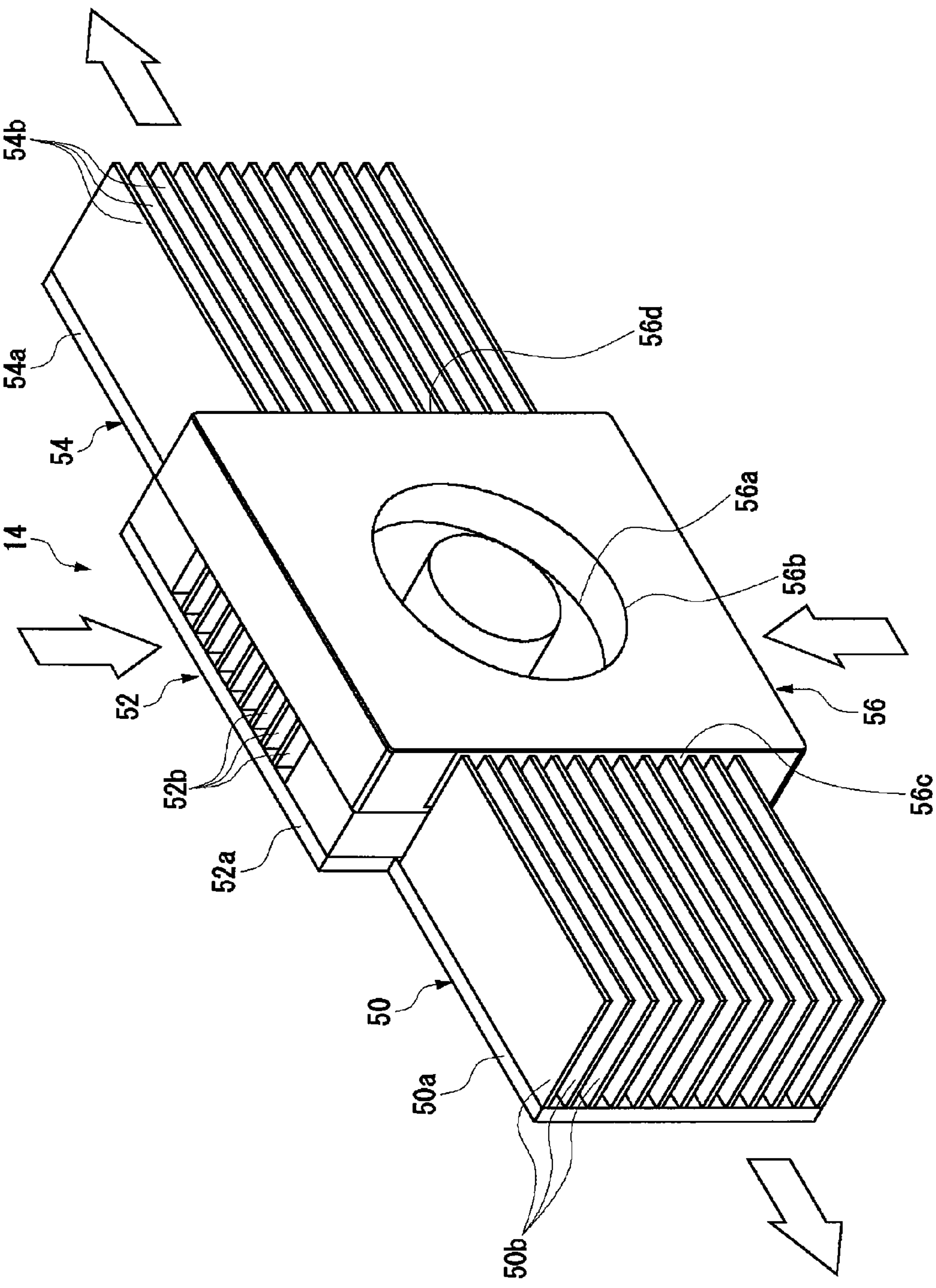
FIG. 2 is a perspective illustration of a heatsink and a fan of an automotive lamp according to a first embodiment of the present invention.

FIG. 2 is a perspective illustration of a heatsink 14 and a centrifugal fan 56 of an automotive lamp 10 according to the first embodiment of the present invention. As shown in FIG. 2, the heatsink 14 is comprised of a first sub-heatsink 50, a second sub-heatsink 52, and a third sub-heatsink 54. In the heatsink 14, the second sub-heatsink 52 is located in the middle, with the first sub-heatsink 50 on the left and the third sub-heatsink 54 on the right facing frontward from the automotive lamp 10. The first lamp unit is mounted to the first sub-heatsink 50, the second lamp unit to the second sub-heatsink 52, and the third lamp unit to the third sub-heatsink 54 (first to third lamp units being not shown in FIG. 2).

The first sub-heatsink 50 is comprised of a first base part 50*a* and a plurality of first plate fins 50*b* mounted upright on the first base part 50*a* in parallel with each other at predetermined intervals. Formed between the plurality of first plate fins 50*b* are a plurality of ventilation passages in parallel with each other. Also, the second sub-heatsink 52 is comprised of a second base part 52*a* and a plurality of second plate fins 52*b* disposed upright on the second base part 52*a* in parallel with each other at predetermined intervals. Formed between the plurality of second plate fins 52*b* are a plurality of ventilation passages in parallel with each other. Also, the third sub-heatsink 54 is comprised of a third base part 54*a* and a plurality of third plate fins 54*b* disposed upright on the third base part 54*a* in parallel with each other at predetermined intervals. Formed between the plurality of third plate fins 54*b* are a plurality of ventilation passages in parallel with each other.

The first base part 50*a*, the second base part 52*a* and the third base part 54*a* are formed by a single plate member. In this manner, forming the first to third base parts 50*a* to 54*a* by a single plate member allows easy handling of the first to third sub-heatsinks 50 to 54 as a single assembly. As a result, the assembly can be installed on the lamp body 48 with great ease. Alternatively, however, the first to third base parts 50*a* to 54*a* may be formed as separate bodies, in which case the manufacture of the first to third sub-heatsinks 50 to 54 can be made easier.

In the first embodiment, the first plate fins 50*b* of the first sub-heatsink 50 are so formed as to extend in the left-right (horizontal) direction. The direction of extension of the plate fins meant here is the longitudinal direction of the plate fins. Also, the third plate fins 54*b* of the third sub-heatsink 54 are so formed as to extend in the left-right (horizontal) direction. On the other hand, the second plate fins 52*b* of the second sub-heatsink 52, which is located in the middle, are so formed as to extend in the vertical direction. That is, the direction of extension of the plate fins of the second sub-heatsink 52 is perpendicular to the direction thereof of the first sub-heatsink 50 and the third sub-heatsink 54.

The first plate fins 50*b* and the third plate fins 54*b* are so formed as to be approximately the same in height from the base part. On the other hand, the second plate fins 52*b* are so formed that the height from the base part thereof is about half that of the first plate fins 50*b* and the third plate fins 54*b*. Accordingly, there results a space, between the first plate fins 50*b* and the third plate fins 54*b*, recessed as much as the second plate fins 52*b* are lower in height than the first plate fins 50*b* and the third plate fins 54*b*.

The centrifugal fan 56 is installed on the second plate fins 52*b* in such a manner that it fits into the above-mentioned recessed space. The centrifugal fan 56 has an air inlet 56*a* in the front in the axial direction thereof and an air inlet 56*b* in the rear in the axial direction thereof for drawing air in, an air outlet 56*c* in the left side thereof for discharging air leftward perpendicular to the axial direction thereof, and an air outlet 56*d* in the right side thereof for discharging air rightward perpendicular to the axial direction thereof. As power is supplied to a motor (not shown) of the centrifugal fan 56 and fan blades (not shown) begin rotating, air is drawn in through the axially front air inlet 56*a* and the axially rear air inlet 56*b* and then discharged leftward and rightward through the left-side air outlet 56*c* and the right-side air outlet 56*d*, respectively.

As air is drawn in through the axially front air inlet 56*a*, the pressure inside the ventilation passages of the second sub-heatsink 52 becomes negative, so that air flows into the ventilation passages between the second plate fins 52*b* from above and below. In this manner, the second sub-heatsink 52 is subjected to a forced air cooling by the intake of air caused by the centrifugal fan 56.

The left-side air outlet 56*c* and the right-side air outlet 56*d* of the centrifugal fan 56 are so formed that the height thereof is about half that of the first plate fins 50*b* and the third plate fins 54*b*. Hence, when the centrifugal fan 56 is installed on the second sub-heatsink 52, the entrances of the ventilation passages of the first sub-heatsink 50 face the left-side air outlet 56*c* and the entrances of the ventilation passages of the third sub-heatsink 54 face the right-side air outlet 56*d*. As a result, most of the air discharged leftward from the left-side air outlet 56*c* flows into the ventilation passages between the first plate fins 50*b*, so that the first sub-heatsink 50 is subjected to a forced air cooling. Likewise, most of the air discharged rightward from the right-side air outlet 56*d* flows into the ventilation passages between the third plate fins 54*b*, so that the third sub-heatsink 54 is subjected to a forced air cooling.

In the first embodiment, the ventilation passages of the first sub-heatsink 50 whose entrances face the left-side air outlet 56*c* of the centrifugal fan 56 extend in a direction parallel to the air discharge direction of the left-side air outlet 56*c*. Also, the ventilation passages of the third sub-heatsink 54 whose entrances face the right-side air outlet 56*d* of the centrifugal fan 56 extend in a direction parallel to the air discharge direction of the right-side air outlet 56*d*. Thus, extension of each ventilation passage whose entrance faces each of the air outlets of the centrifugal fan 56 in a direction parallel to the air discharge direction of each air outlet allows a smooth flow of air through each ventilation passage, and this promotes a forced air cooling of each sub-heatsink.

Next, the heat radiation mechanism in the automotive lamp 10 according to the first embodiment will be described. In FIG. 2, white arrows indicate the flows of air. In the automotive lamp 10 as shown in FIG. 1, as the LED 20 of each lamp unit 30 emits light, the heat resulting from the emission of light is conducted to the mounting member 26 through the thermally conductive insulating substrate 24 with which the LED 20 is in contact. The heat conducted to the mounting member 26 of each lamp unit 30 is conducted to the base part of the sub-heatsink with which the rear end of each mounting member 26 is in contact. In this manner, the thermally conductive insulating substrate 24 and the mounting member 26 function as heat conductors conducting the heat produced by the LED 20 to the sub-heatsink. The heat conducted to the base part of each sub-heatsink is conducted to the plate fins of each sub-heatsink before it is radiated into the surrounding air.

As the fan blades are rotated with power supplied to the motor of the centrifugal fan 56 and, air is drawn in through the axially front air inlet 56*a* and the axially rear air inlet 56*b* and then discharged leftward and rightward through the left-side air outlet 56*c* and the right-side air outlet 56*d*, respectively.

With the intake of air through the axially front air inlet 56*a*, the pressure inside the ventilation passages of the second sub-heatsink 52 becomes negative, so that, as shown in FIG. 2, air flows into the ventilation passages between the second plate fins 52*b* from above and below. Thus, the air whose temperature is raised by the heat radiated from the second plate fins 52*b* of the second sub-heatsink 52 is drawn in by the centrifugal fan 56, and new air is introduced into the ventilation passages.

The air discharged from the left-side air outlet 56*c* of the centrifugal fan 56 flows through the entrances of the ventilation passages facing the left-side air outlet 56*c* into the ventilation passages of the first sub-heatsink 50. As a result, the air whose temperature is raised by the heat radiated from the first plate fins 50*b* of the first sub-heatsink 50 is discharged from the exits of the ventilation passages as shown in FIG. 2. Similarly, the air discharged from the right-side air outlet 56*d* of the centrifugal fan 56 flows through the entrances of the ventilation passages facing the right-side air outlet 56*d* into the ventilation passages of the third sub-heatsink 54. As a result, the air whose temperature is raised by the heat radiated from the third plate fins 54*b* of the third sub-heatsink 54 is discharged from the exits of the ventilation passages as shown in FIG. 2.

By a mechanism as described above, the sub-heatsinks of the heatsink 14 are subjected to a forced air cooling, and the heat produced by the lamp units 30 connected to the respective sub-heatsinks is radiated. In the automotive lamp 10 according to the first embodiment, the air from the centrifugal fan 56 is discharged in two directions, namely, leftward and rightward, and the plate fins are formed such that the entrances of the ventilation passages of the first sub-heatsink 50 and the third sub-heatsink 54 face the left-side air outlet 56*c* and the right-side air outlet 56*d*, respectively. This configuration provides more parts of the heatsink 14 that are exposed to the drafts of air sent. As a result, the forced air cooling of the heatsink 14 is better facilitated, thus radiating the heat produced by the LED 20 more efficiently.

The automotive lamp 10 according to the first embodiment is so configured that the second plate fins 52*b* are provided in the axial front of the centrifugal fan 56 and thus the second sub-heatsink 52 is subjected to a forced air cooling by the intake of air caused by the centrifugal fan 56. In this manner, the utilization of not only the discharge of air from the centrifugal fan 56 but also the intake of air thereby for forced air cooling ensures the radiation of the heat produced by the LED 20 with greater efficiency.

Moreover, the automotive lamp 10 is so structured that the second plate fins 52*b* of the second sub-heatsink 52, which are subjected to forced air cooling by the intake of air caused by the centrifugal fan 56, extend in a direction perpendicular to the direction in which the first plate fins 50*b* of the first sub-heatsink 50 and the third plate fins 54*b* of the third sub-heatsink 54, which are subjected to forced air cooling by the discharge of air caused by the centrifugal fan 56, extend. If the air immediately after the discharge goes back to the air inlets of the centrifugal fan, then there will be no active circulation of air inside the lamp chamber, which leads to a drop in heat radiation efficiency. Formation of the plate fins as implemented in the first embodiment can therefore prevent the air immediately after the discharge from going back to the air inlets of the centrifugal fan. And this promotes an active circulation of air inside the lamp chamber, thus improving the heat radiation efficiency.

Further, in the first embodiment, a recessed space is provided by the second plate fins 52*b* whose height from the base part is lower than the plate fins of the sub-heatsinks on both sides, and the centrifugal fan 56 is fitted into the recessed space. This configuration realizes a compact heat radiation structure of the heatsink 14 and the centrifugal fan 56 in combination. And this heat radiation structure can be applied for use in more automotive lamps.

Figure 3:
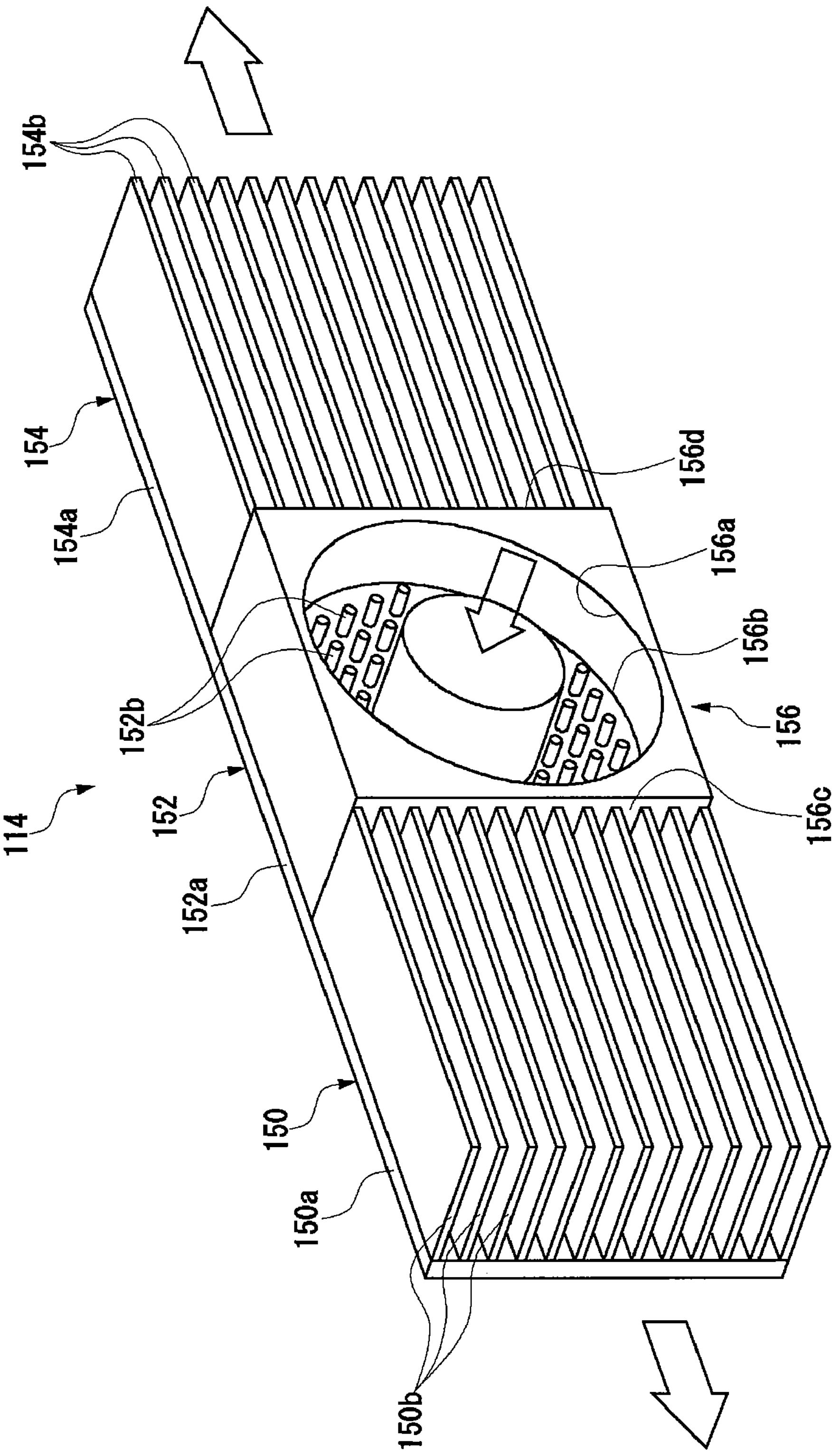
FIG. 3 is a perspective illustration of a heatsink and a fan of an automotive lamp according to a second embodiment of the present invention.

FIG. 3 is a perspective illustration of a heatsink 114 and a fan 156 of an automotive lamp according to a second embodiment of the present invention. Though the structure of the automotive lamp according to the second embodiment is basically the same as that of the automatic lamp 10 shown in FIG. 1, the structure differs in the heatsink 114 and the fan 156. Note that the structural components identical or equivalent to those in the first embodiment are denoted with the same reference numerals as those therein, and the repeated description thereof will be omitted as appropriate.

In the second embodiment, the heatsink 114 is comprised of a first sub-heatsink 150, a second sub-heatsink 152, and a third sub-heatsink 154. In the heatsink 114, the second sub-heatsink 152 is located in the middle, with the first sub-heatsink 150 on the left and the third sub-heatsink 154 on the right facing frontward from the automotive lamp 10. The first lamp unit is mounted to the first sub-heatsink 150, the second lamp unit to the second sub-heatsink 152, and the third lamp unit to the third sub-heatsink 154 (first to third lamp units being not shown in FIG. 3).

The first sub-heatsink 150 is comprised of a first base part 150*a* and a plurality of first plate fins 150*b* mounted upright on the first base part 150*a* in parallel with each other at predetermined intervals. Formed between the plurality of first plate fins 150*b* are a plurality of ventilation passages in parallel with each other. Also, the third sub-heatsink 154 is comprised of a third base part 154*a* and a plurality of third plate fins 154*b* mounted upright on the third base part 54*a* in parallel with each other at predetermined intervals. Formed between the plurality of third plate fins 154*b* are a plurality of ventilation passages in parallel with each other. On the other hand, the second sub-heatsink 152 is comprised of a second base part 152*a* and a plurality of pin fins 152*b* disposed upright on the second base part 152*a* in parallel with each other at predetermined intervals.

The first base part 150*a*, the second base part 152*a* and the third base part 154*a* are formed by a single plate member. In this manner, forming the first to third base parts 150*a* to 154*a* by a single plate member allows handling of the first to third sub-heatsinks 150 to 154 as a single assembly. As a result, the handling can be easy and the assembly can be installed on the lamp body 48 with great ease. Alternatively, however, the first to third base parts 150*a* to 154*a* may be formed as separate bodies, in which case the manufacture of the first to third sub-heatsinks 150 to 154 can be made easier.

In the second embodiment, the first plate fins 150*b* of the first sub-heatsink 150 are so formed as to extend in the left-right (horizontal) direction. Also, the third plate fins 154*b* of the third sub-heatsink 154 are so formed as to extend in the left-right (horizontal) direction. The pin fins 152*b* of the second sub-heatsink 152 are so formed as to have a predetermined arrangement pattern.

The first plate fins 150*b* and the third plate fins 154*b* are so formed as to be approximately the same in height from the base part. On the other hand, the pin fins 152*b* are so formed that the height from the base part thereof is about half that of the first plate fins 150*b* and the third plate fins 154*b*. Accordingly, there results a space, between the first plate fins 150*b* and the third plate fins 154*b*, recessed as much as the pin fins 152*b* are lower in height than the first plate fins 150*b* and the third plate fins 154*b*.

A fan 156 is installed on the pin fins 152*b* in such a manner that it fits into the above-mentioned recessed space. The fan 156 is a fan, which combines a centrifugal fan and an axial flow fan, structured such that the air drawn in from one axial direction can be discharged in a plurality of directions perpendicular to the axial direction and at the same time can be discharged in the other axial direction. The fan 156 has an air inlet 156*a* in the rear in the axial direction for drawing air in, a front-side air outlet 156*b* for discharging air in the front in the axial direction of the fan 156, an air outlet 156*c* in the left side thereof for discharging air leftward perpendicular to the axial direction thereof, and an air outlet 156*d* in the right side thereof for discharging air rightward perpendicular to the axial direction thereof. As power is supplied to a motor (not shown) of the fan 156 and fan blades begin rotating (here the fan blades are not shown in FIG. 3 for the purpose of making the pin fins 152*b* more visible), air is drawn in through the axially rear air inlet 156*a* and then discharged frontward, leftward and rightward through the front-side air outlet 156*b*, the left-side air outlet 156*c* and the right-side air outlet 156*d*, respectively.

As air is discharged frontward through the front-side air outlet 156*b*, the second sub-heatsink 152 is subjected to a forced air cooling. The left-side air outlet 156*c* and the right-side air outlet 156*d* of the fan 156 are so formed that the height thereof is about half that of the first plate fins 150*b* and the third plate fins 154*b*. Hence, when the fan 156 is installed on the second sub-heatsink 152, the entrances of the ventilation passages of the first sub-heatsink 150 face the left-side air outlet 156*c* and the entrances of the ventilation passages of the third sub-heatsink 154 face the right-side air outlet 156*d*. As a result, most of the air discharged leftward from the left-side air outlet 56*c* flows into the ventilation passages between the first plate fins 150*b*, so that the first sub-heatsink 150 is subjected to a forced air cooling. Likewise, most of the air discharged rightward from the right-side air outlet 156*d* flows into the ventilation passages between the third plate fins 154*b*, so that the third sub-heatsink 154 is subjected to a forced air cooling.

In this manner, in the second embodiment the air drawn in through the axially rear air inlet 156*a* is discharged in three directions, namely, frontward, leftward and rightward. Hence, the air can be sent to as many regions of the heatsink 114 as possible. As a result, the heat produced by each lamp unit can be radiated efficiently.

Next, a heat radiation mechanism in the automotive lamp according to the second embodiment will be described. In FIG. 3, white arrows indicate the flows of air. In the automotive lamp as shown in FIG. 3, as the LED 20 of each lamp unit 30 emits light, the heat resulting from the emission of light is conducted to the mounting member 26 through the thermally conductive insulating substrate 24 with which the LED 20 is in contact. The heat conducted to the mounting member 26 of each lamp unit 30 is conducted to the base part of each sub-heatsink with which the rear end of each mounting member 26 is in contact. The heat conducted to the first base part 150*a* and the third base part 154*a* is conducted to the first plate fins 150*b* and the third plate fins 154*b* before it is radiated into the surrounding air. Also, the heat conducted to the second base part 152*a* is conducted to the pin fins 152*b* before it is radiated into the surrounding air.

As the fan blades are rotated with power supplied to the motor of the fan 156 and, air is drawn in through the axially rear air inlet 156*a* and then discharged frontward, leftward and rightward through the front-side air outlet 156*b*, the left-side air outlet 156*c* and the right-side air outlet 156*d*, respectively.

With the air discharged forward from the front-side air outlet 156*b*, the pin fins 152*b* are exposed to the air. The air whose temperature is raised by the heat radiated from the pin fins 152*b* is diffused in all directions through spaces between the pin fins 162. After the second sub-heatsink 152 is subjected to a forced air cooling, the diffused air flows into the first sub-heatsink 150 and the third sub-heatsink 154, so that the first sub-heatsink 150 and the third sub-heatsink 154 are subjected to a forced air cooling.

The air discharged from the left-side air outlet 156*c* of the fan 156 flows through the entrances facing the left-side air outlet 156*c* into the ventilation passages of the first sub-heatsink 150. As a result, the air whose temperature is raised by the heat radiated from the first plate fins 150*b* is discharged from the exits of the ventilation passages as shown in FIG. 3. Similarly, the air discharged from the right-side air outlet 156*d* of the fan 156 flows through the entrances facing the right-side air outlet 156*d* into the ventilation passages of the third sub-heatsink 154. As a result, the air whose temperature is raised by the heat radiated from the third plate fins 154*b* is discharged from the exits of the ventilation passages as shown in FIG. 3.

By the mechanism as described above, the sub-heatsinks of the heatsink 114 are subjected to a forced air cooling, and the heat produced by the lamp units 30 connected to the respective sub-heatsinks is radiated. In the second embodiment, the air from the fan 156 is discharged in three directions, namely, frontward, leftward and rightward. Also, the plate fins are formed such that the entrances of the ventilation passages of the first sub-heatsink 150 and the third sub-heatsink 154 face the left-side air outlet 156*c* and the right-side air outlet 156*d*, respectively. Further, the pin fins 152*b* are formed in the axially front direction of the fan 156. This configuration increases the number of parts of the heatsink 114 that are exposed to the drafts of air sent. As a result, the forced air cooling of the heatsink 114 is better facilitated, thus radiating the heat produced by the LED 20 more efficiently.

Also, in the second embodiment, the fins for the second sub-heatsink 152 disposed frontward of the fan 156 is pin-fin shaped. For example, if the fins for the second sub-heatsink 152 are plate fins, the air discharged forward in the axial direction will flow in the left and right directions through the ventilation passages between the plate fins and therefore the wind velocity will differ between each of the ventilation passages of the first sub-heatsink 150 and each of the ventilation passages of the third sub-heatsink 154. By employing the pin fins as the fins for the second sub-heatsink 152 as with this second embodiment, the directional characteristics in the surface direction of air discharged forward in the axial direction can be eliminated. Thus the difference in wind velocity between each of the ventilation passages of the first sub-heatsink 150 and each of the ventilation passages of the third sub-heatsink 154 will be less likely to be caused and the forced air cooling can be done uniformly.

Moreover, in the second embodiment, a recessed space is provided by the pin fins 152*b* whose height from the base part is lower than the plate fins of the sub-heatsinks on both sides, and the fan 156 is fitted into the recessed space. This configuration realizes a compact heat radiation structure of the heatsink 114 and the fan 156 in combination. And this heat radiation structure can be applied for use in more automotive lamps.

The present invention has been described by referring to each of the above-described embodiments and such description is for illustrative purposes only. It is understood by those skilled in the art that various modifications to constituting elements and processes could be developed and that such modifications are also within the scope of the present invention.

In the above-described embodiments, LEDs are used as the light sources. However, this should not be considered as limiting and, for example, semiconductor light emitting devices such as semiconductor laser may be used.

In the above-described embodiments, a projector-type lamp unit is used but this should not be considered as limiting and, for example, a parabola-type or directi-emitting-type lamp unit may be used.

In the above-described embodiments, two air outlets are provided for discharging the air in the axial and vertical directions but this should not be considered as limiting. A plurality of air outlets in more different directions than two may be provided for the fan. In such a case, a plate fin is formed so that at least one entrance of the ventilation passages of the heatsink faces each air outlet.

In the heatsink 14 shown in FIG. 2, a cover or covers used to prevent the air sent from the centrifugal fan 56 from being leaked along the ventilation passages may be provided at upper ends of the first plate fins 50*b* and the third plate fins 54*b* (at the ends opposite to the first base part 50*a* side and the third base part 54*a* side). In this case, the wind velocity at regions away from the left-side air outlet 56*c* and the right-side air outlet 56*d* does not drop, so that the heat can be radiated efficiently. A similar cover or covers as described above may be applied to the heatsink 114 of FIG. 3.

We claim:

1. An automotive lamp comprising:

a semiconductor light emitting device as a light source;

a heatsink which radiates heat produced by the semiconductor light emitting device, the heatsink including a plurality of plate fins installed upright on a base part and a plurality of ventilation passages formed between the plate fins;

a centrifugal fan which performs a forced air cooling of the plate fins by sending air through the ventilation passages of the heatsink, the centrifugal fan having air inlets open in an axial direction thereof for drawing air in and a plurality of air outlets for discharging air in a plurality of directions perpendicular to the axial direction thereof; and a lamp housing which houses the semiconductor light emitting device, heatsink, and centrifugal fan, wherein the plate fins of the heatsink are formed such that an entrance of at least one of the plurality of ventilation passages faces each of the air outlets of the centrifugal fan, and wherein the heatsink further includes a plurality of fins in the axial direction of the centrifugal fan, and the plurality of fins are subjected to a forced air cooling by an intake of air caused by the centrifugal fan.

2. An automotive lamp according to claim 1, wherein each ventilation passage whose entrance faces each of the air outlets of the centrifugal fan extends in a direction parallel to an air discharge direction of each of the air outlets.

3. An automotive lamp according to claim 1, wherein a cover used to prevent air sent from the centrifugal fan from being leaked along the ventilation passages is provided at upper ends of the plate fins.

4. An automotive lamp comprising:

a semiconductor light emitting device as a light source;

a heatsink which radiates heat produced by the semiconductor light emitting device, the heatsink including a plurality of plate fins installed upright on a base part and a plurality of ventilation passages formed between the plate fins;

a centrifugal fan which performs a forced air cooling of the plate fins by sending air through the ventilation passages of the heatsink, the centrifugal fan having air inlets open in an axial direction thereof for drawing air in and a plurality of air outlets for discharging air in a plurality of directions perpendicular to the axial direction thereof; and a lamp housing which houses the semiconductor light emitting device, heatsink, and centrifugal fan, wherein the plate fins of the heatsink are formed such that an entrance of at least one of the plurality of ventilation passages faces each of the air outlets of the centrifugal fan, the heatsink further includes a plurality of fins in the axial direction of the centrifugal fan, and the plurality of fins are subjected to a forced air cooling by an intake of air caused by the centrifugal fan, wherein the fins which are subjected to a forced air cooling by an intake of air caused by the centrifugal fan are plate fins, and the plate fins extend in a direction perpendicular to a direction in which the plate fins, which are subjected to a forced air cooling by a discharge of air caused by the centrifugal fan, extend.

5. An automotive lamp according to claim 4, wherein the plate fins which are subjected to a forced air cooling by an intake of air caused by the centrifugal fan are formed in a manner such that the height thereof is lower than that of the plate fins which are subjected to a forced air cooling by a discharge of air caused by the centrifugal fan.

6. An automotive lamp according to claim 5, wherein the centrifugal fan is installed on the plate fins which are subjected to a forced cooling air by an intake of air caused by the centrifugal fan.

7. An automotive lamp comprising:

a semiconductor light emitting device as a light source;

a heatsink which radiates heat produced by the semiconductor light emitting device, the heatsink including a plurality of plate fins installed upright on a base part and a plurality of ventilation passages formed between the plate fins;

a centrifugal fan which performs a forced air cooling of the plate fins by sending air through the ventilation passages of the heatsink, the centrifugal fan having air inlets open in an axial direction thereof for drawing air in and a plurality of air outlets for discharging air in a plurality of directions perpendicular to the axial direction thereof; and a lamp housing which houses the semiconductor light emitting device, heatsink, and centrifugal fan, wherein the plate fins of the heatsink are formed such that an entrance of at least one of the plurality of ventilation passages faces each of the air outlets of the centrifugal fan, wherein the centrifugal fan is structured such that air drawn in from one axial direction is dischargeable in a plurality of directions perpendicular to the axial direction and is dischargeable in the other axial direction, and wherein regions of the heatsink in the other axial direction of the centrifugal fan are subject to a forced air cooling by a discharge of air caused by the centrifugal fan in the other axial direction.

8. An automotive lamp according to claim 7, wherein a plurality of pin fins are provided on the regions of the heatsink in the other axial direction of the centrifugal fan.

9. An automotive lamp according to claim 8, wherein the pin fins are formed in a manner such that the height thereof is lower than that of the plate fins which are subjected to a forced air cooling by a discharge of air in a direction perpendicular to the axial direction of the centrifugal fan.

10. An automotive lamp according to claim 9, wherein the centrifugal fan is installed on the pin fins.

* * * * *